(12) United States Patent
Wang et al.

(10) Patent No.: US 11,164,561 B2
(45) Date of Patent: Nov. 2, 2021

(54) METHOD AND SYSTEM FOR BUILDING SPEECH RECOGNIZER, AND SPEECH RECOGNITION METHOD AND SYSTEM

(71) Applicant: BAIDU ONLINE NETWORK TECHNOLOGY (BEIJING) CO., LTD., Beijing (CN)

(72) Inventors: Zhijian Wang, Beijing (CN); Sheng Qian, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 206 days.

(21) Appl. No.: 16/544,524

(22) Filed: Aug. 19, 2019

(65) Prior Publication Data

US 2020/0118545 A1   Apr. 16, 2020

(30) Foreign Application Priority Data

Oct. 15, 2018   (CN) .......................... 201811196304.4

(51) Int. Cl.
| | |
|---|---|
| *G10L 15/02* | (2006.01) |
| *G10L 15/19* | (2013.01) |
| *G10L 15/05* | (2013.01) |
| *G10L 15/06* | (2013.01) |
| *G10L 15/16* | (2006.01) |

(52) U.S. Cl.
CPC .............. *G10L 15/02* (2013.01); *G10L 15/05* (2013.01); *G10L 15/063* (2013.01); *G10L 15/16* (2013.01); *G10L 15/19* (2013.01); *G10L 2015/027* (2013.01)

(58) Field of Classification Search
None
See application file for complete search history.

(56) References Cited

U.S. PATENT DOCUMENTS

| | | | | |
|---|---|---|---|---|
| 9,460,711 | B1 * | 10/2016 | Vanhoucke | G10L 15/063 |
| 10,121,467 | B1 * | 11/2018 | Gandhe | G06F 40/284 |
| 2006/0020461 | A1 * | 1/2006 | Ogawa | G10L 15/04 |
| | | | | 704/251 |
| 2008/0082337 | A1 * | 4/2008 | Joublin | G10L 15/063 |
| | | | | 704/254 |
| 2012/0203553 | A1 * | 8/2012 | Maruta | C01G 41/00 |
| | | | | 704/243 |
| 2012/0221335 | A1 * | 8/2012 | Zhao | G10L 15/32 |
| | | | | 704/250 |

(Continued)

*Primary Examiner* — Douglas Godbold
(74) *Attorney, Agent, or Firm* — Ladas & Parry, LLP

(57) ABSTRACT

A method and system for building a speech recognizer, and a speech recognition method and system are proposed. The method for building a speech recognizer includes: reading and parsing each grammar file, and building a network of each grammar; reading an acoustic syllable mapping relationship table, and deploying the network of each grammar as a syllable network; performing a merge minimization operation for each syllable network to form a sound element decoding network; forming the speech recognizer by using the sound element decoding network and a language model. The technical solutions of the present disclosure may be applied to exhibit strong extensibility, support an N-Gram language model, support a class model, present flexible use, and adapt for an embedded recognizer in a vehicle-mounted environment.

16 Claims, 4 Drawing Sheets

(56) References Cited

U.S. PATENT DOCUMENTS

| | | | |
|---|---|---|---|
| 2016/0027437 A1* | 1/2016 | Hong | G10L 15/187 704/254 |
| 2016/0099010 A1* | 4/2016 | Sainath | G06N 3/0445 704/232 |
| 2020/0349927 A1* | 11/2020 | Stoimenov | G10L 15/063 |
| 2020/0357388 A1* | 11/2020 | Zhao | G06K 9/623 |

* cited by examiner

METHOD AND SYSTEM FOR BUILDING SPEECH RECOGNIZER, AND SPEECH RECOGNITION METHOD AND SYSTEM

CROSS REFERENCE TO RELATED APPLICATION

The present application claims the priority to Chinese Patent Application No. 201811196304.4, filed on Oct. 15, 2018, with the title of "Method and system for building speech recognizer and speech recognition method and system," the disclosure of which is incorporated herein by reference in its entirety.

FIELD

The present disclosure relates to the technical field of speech processing, and particularly to a method and system for building a speech recognizer, and a speech recognition method and system.

BACKGROUND

Although the network prevails increasingly, there are still many cases without a network or with a weak network. At this time, it is difficult to implement the speech recognition service using the cloud. Furthermore, it is more convenient to place some uncomplicated speech recognition instructions or short queries into a local embedded recognizer with quicker response and more convenient use.

In a current local speech recognition technical solution, each speech is built based on a vocabulary and a grammar format given by the user, is singular and less extensible, does not support multi-grammar construction, and does not support a class model, and the use is not flexible enough.

SUMMARY

Aspects of the present disclosure provide a method and system for building a speech recognizer, and a speech recognition method and system, to provide a flexible speech recognition technical solution.

According to an embodiment of the present disclosure, a method for building a speech recognizer is proposed, the method includes:
reading and parsing each grammar file, and building a network of each grammar;
reading an acoustic syllable mapping relationship table, and deploying the network of each grammar as a syllable network;
performing a merge minimization operation for each syllable network to form a syllable decoding network;
forming the speech recognizer by using the syllable decoding network, an acoustic model and a language model.

According to an embodiment of the present disclosure, the reading and parsing each grammar file may include:
parsing each grammar file to obtain dictionary information and a connection relationship in each grammar file.

According to an embodiment of the present disclosure, the acoustic syllable mapping relationship table is a pre-trained DNN model.

According to an embodiment of the present disclosure, the syllable is a pronunciation of each word.

According to an embodiment of the present disclosure, the performing a merge minimization operation for each syllable network may include:
optimizing combinations of the respective syllable networks by using a computer graph theory method.

According to an embodiment of the present disclosure, the language model is an N-Gram language model.

According to an embodiment of the present invention, a speech recognition method is proposed, the method includes:
obtaining target audio data;
extracting a target filter bank feature in the target audio data;
taking the target filter bank feature in the target audio data as input data of the speech recognizer, and obtaining target word sequence data corresponding to the target audio data.

According to an embodiment of the present disclosure, the taking the target filter bank feature in the target audio data as input data of the speech recognizer, and obtaining target word sequence data corresponding to the target audio data comprises:
taking the target filter bank feature in the target audio data as input data of a trained DNN model, and obtaining a posterior probability feature on a target phoneme state of a first target filter bank feature;
obtaining the target word sequence data corresponding to the target audio data from the speech recognizer by employing a phoneme conversion probability of a trained HMM, the posterior probability feature on the target phoneme state of the first target filter bank feature and the N-Gram language model.

According to an embodiment of the present disclosure, a system for building a speech recognizer is proposed, the system includes:
a building module configured to read and parse each grammar file, and build a network of each grammar;
a deploying module configured to read an acoustic syllable mapping relationship table, and deploy the network of each grammar as a syllable network;
a merging module configured to perform a merge minimization operation for each syllable network to form a syllable decoding network;
a generating module configured to form the speech recognizer by using the syllable decoding network, an acoustic model and a language model.

According to an embodiment of the present disclosure, the building module is specifically configured to:
parse each grammar file to obtain dictionary information and a connection relationship in each grammar file.

According to an embodiment of the present disclosure, the acoustic syllable mapping relationship table is a pre-trained DNN model.

According to an embodiment of the present disclosure, the syllable is a pronunciation of each word.

According to an embodiment of the present disclosure, the merging module is specifically configured to:
optimize combinations of the respective syllable networks by using a computer graph theory method.

According to an embodiment of the present disclosure, the language model is an N-Gram language model.

According to an embodiment of the present disclosure, a speech recognition system is proposed, the system includes:
an audio data obtaining module configured to obtain target audio data;
a feature extracting module configured to extract a target filter bank feature in the target audio data;
a word sequence obtaining module configured to take the target filter bank feature in the target audio data as input data of the speech recognizer, and obtain target word sequence data corresponding to the target audio data.

According to an embodiment of the present disclosure, the word sequence obtaining module is specifically configured to:

take the target filter bank feature in the target audio data as input data of a trained DNN model, and obtain a posterior probability feature on a target phoneme state of the first target filter bank feature;

obtain the target word sequence data corresponding to the target audio data from the speech recognizer by employing a phoneme conversion probability of a trained HMM, the posterior probability feature on the target phoneme state of the first target filter bank feature, and the N-Gram language model.

According to an embodiment of the present disclosure, a computer device is proposed, the computer device includes a memory, a processor and a computer program which is stored on the memory and runs on the processor, the processor, upon executing the program, implementing the above-mentioned method.

According to an embodiment of the present disclosure, there is provided a computer-readable storage medium on which a computer program is stored, the program, when executed by a processor, implementing the aforesaid method.

As may be seen from the above description, the technical solutions of the present disclosure may be provided to provide a flexible speech recognition technical solution.

DETAILED DESCRIPTION OF EMBODIMENTS

To make objectives, technical solutions and advantages of embodiments of the present disclosure clearer, technical solutions of embodiment of the present disclosure will be described clearly and completely with reference to figures in embodiments of the present disclosure. Obviously, embodiments described here are partial embodiments of the present disclosure, not all embodiments. All other embodiments obtained by those having ordinary skill in the art based on the embodiments of the present disclosure, without making any inventive efforts, fall within the protection scope of the present disclosure.

Figure 1:
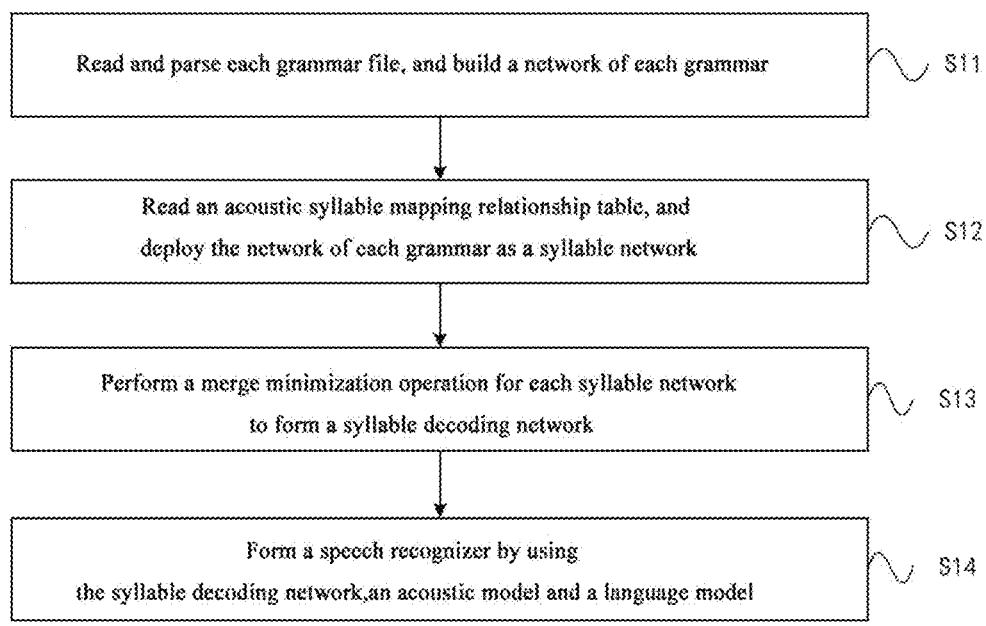
FIG. 1 is a flow chart of a method of building a speech recongnizer according to an embodiment of the present disclosure.

FIG. 1 is a flow chart of a method of building a speech recognizer according to an embodiment of the present disclosure. As shown in FIG. 1, the method includes the following steps:

Step S11: reading and parsing each grammar file, and building a network of each grammar;

Step S12: reading an acoustic syllable mapping relationship table, and deploying the network of each grammar as a syllable network;

Step S13: performing a merge minimization operation for each syllable network to form a sound element decoding network;

Step S14: forming a speech recognizer by using the syllable decoding network, an acoustic model and a language model.

Step S11, S12 and S13 form a method of building a decoding network for speech recognition.

In an optional implementation of step S11,

The speech recognizer described in the present embodiment is mainly applied to a vehicle-mounted speech recognition environment, so a range of speech commands that need to be recognized is small. The grammar files corresponding to most speech commands may be obtained by collecting in advance.

Optionally, the speech command is, for example, calling XX, playing a song, today's weather, opening a map, turning on navigation, turning on a windshield wiper, and the like. The grammar file is, for example, "call\n XX\n".

The each grammar file is parsed to obtain dictionary information and a connection relationship in each grammar file.

Optionally, the dictionary information is the characteristic of each word obtained by segmenting the grammar file, for example, the characteristic of each word includes: a common word, a contact, a number, a song name, a vehicle-mounted device and so on. For example, the common word may be "call", "play" etc.

Optionally, the connection relationship is a connection relationship of each word obtained by segmenting the grammar file, for example, the connection relationship is today's weather, calling+XX, calling+number, playing+song, and the like.

Optionally, the network of each grammar is built, for example, a common word <common_ngram>, the common word+contact <common_ngram>-<chn_name-ngram>, the common word+number <common_ngram>-<num_ngram>, and the common word+song name <common_ngram>-<song_ngram>, etc.

For example, the network of grammar may be a network formed in the unit of word or words.

In an optional implementation of step S12,

The acoustic syllable mapping relationship table is read, and the network of each grammar is deployed as a syllable network.

Optionally, the acoustic syllable mapping relationship table is a pre-trained acoustic model, and the acoustic model is a DNN (Deep Neural Network) model. The DNN model is obtained by pre-training by the following method:

using a training audio corpus to train the GMM (Gaussian Mixed Model) and the HMM (Hidden Markov Model) to obtain a likelihood probability feature of each sound element (acoustic) state included in at least one sound element/acoustic state output by the trained GMM, and obtain a sound element/acoustic conversion probability of the trained HMM; each of the acoustic state corresponds to each syllable.

converting the likelihood probability feature of the each sound element/acoustic state into a posterior probability feature of each sound element/acoustic state;

calculating a matrix weight value and a matrix offset value between output layer nodes in the DNN model according to training Filter bank features extracted from the training audio corpus and the posterior probability feature of the each sound element/acoustic state;

adding the matrix weight value and the matrix offset value to the DNN model to generate a trained DNN model.

Optionally, the network of each grammar is deployed as a syllable network by using the DNN model.

Optionally, each word in the network of each grammar is replaced with a DNN model of the word, the DNN model containing a transition probability between the syllables constituting the word.

Optionally, the syllable is a pronunciation of each word, for example, the syllable of "今" corresponds to "jin", the syllable of "天" corresponds to "tian", and the syllable of "气" corresponds to "qi". For example, the syllable in acoustic state of "paly music" corresponds to "P L_EY M Y_UW Z_IH K/M Y_UW Z_IY K".

A speech processing model for the grammar may be formed by combining the syllable network with the language model. If target audio data is audio data corresponding to the grammar, the target word sequence data corresponding to the target audio data is obtained by taking a sound element/acoustic state sequence of the target audio data as an input.

In an optional implementation of S13,

Optionally, the speech recognizer described in the present embodiment is mainly applied to a vehicle-mounted speech recognition environment, so a range of speech commands that need to be recognized is small. The grammar files corresponding to most speech commands may be obtained by collecting in advance. Therefore, through the above steps, the syllable network corresponding to each grammar file is obtained, and each syllable network may be independently operated to obtain the target word sequence data of its corresponding grammar. The target word sequence data of all grammars may be obtained by combining the respective syllable networks.

In order to save cost and reduce network complexity, the combinations of respective syllable networks may be merged to remove redundant relationship, and the combinations of the respective syllable networks are minimized.

Optionally, the combinations of the respective syllable networks may be optimized by using a computer graph theory method to obtain a syllable decoding network. Any computer graph theory method may be used for optimization here. The computer graph theory method is not described in detail any longer since it is known in the art.

Figure 2:
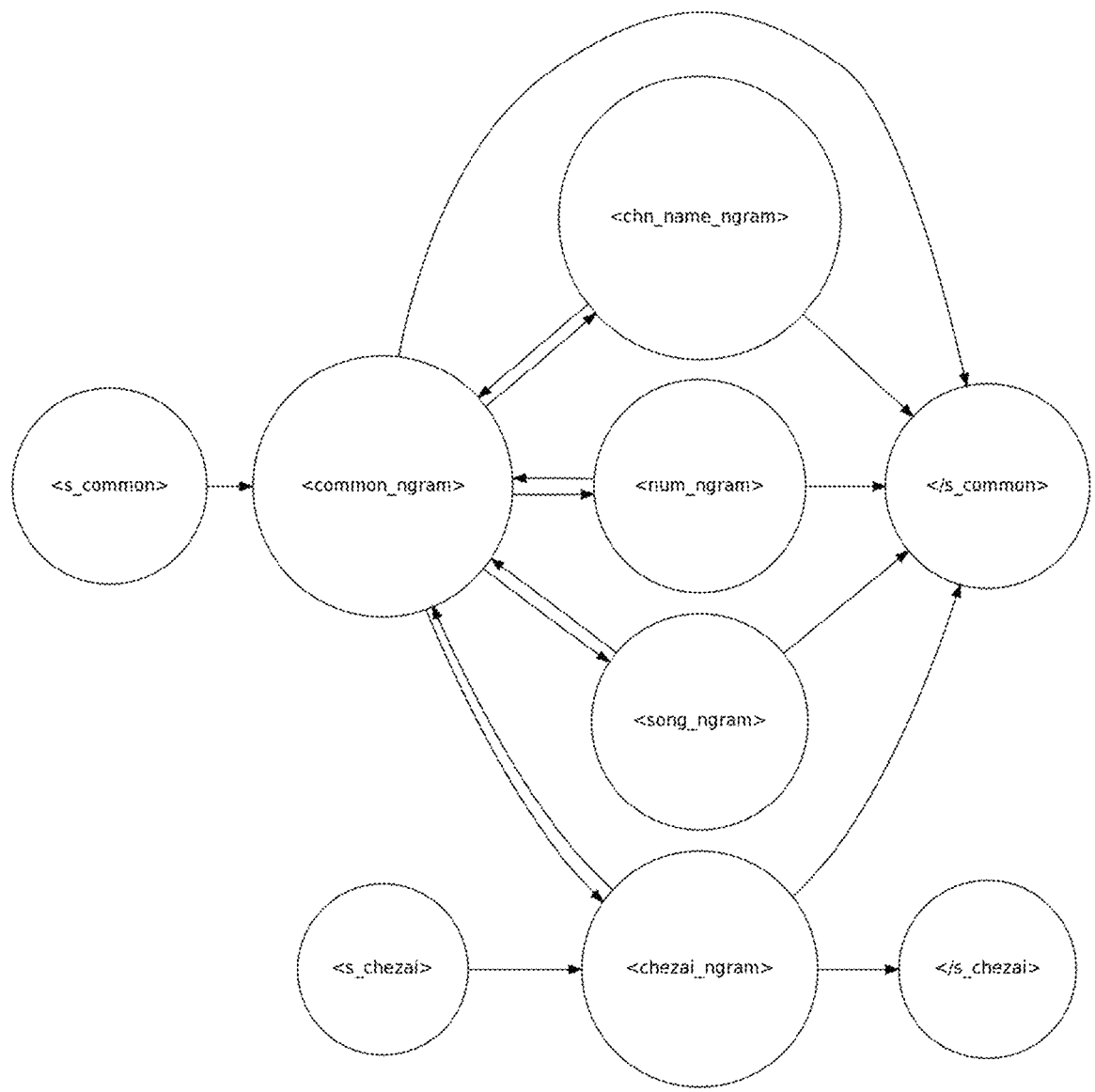
FIG. 2 is a schematic diagram of a grammar network according to an embodiment of the present disclosure.

The syllable decoding network covers all the grammars, as shown in FIG. 2, for example, for an entry <s_common>, the connection relationship is that the entry <s_common> is connected to the common word <common_ngram>, and the common word <common_ngram> may be connected to the contact <chn_name-ngram>, number <num_ngram>, song name <song_ngram>, vehicle-mounted device <chezai_n-gram>, and an ending flag</s_common>. Meanwhile, a vehicle-mounted entry <s_chezai> is also provided to directly respond to a preset vehicle-mounted speech command, for example, open the map, turn on the navigation, or turn on the windshield wiper. Processing may be performed by the common word+vehicle-mounted device, or performed by directly turning on the vehicle-mounted device. <s_common> is a starting flag of a sentence, </s_common> is an ending flag of a sentence, <s_chezai> is a starting flag of the speech processed by the vehicle-mounted entry, and </s_chezai> is an ending flag of the speech processed by the vehicle-mounted entry.

In an optional implementation of step S14, a speech recognizer is formed by using the syllable decoding network, an acoustic model and a language model.

Optionally, the language model is an N-Gram language model. Since the N-Gram language model may infer a probability of occurrence of the next word by itself, so it is possible to weight a probability value of each network path in conjunction with the probability of occurrence, increase possibility of the network path, obtain target word sequence data corresponding to the target audio data in conjunction with the N-Gram language model, and further enhance the accuracy of speech recognition.

Optionally, the N-Gram language mode is obtained by training in the following manner: obtaining an occurrence probability of the training word sequence data in the training word sequence corpus, and generating an N-Gram language model according to the occurrence probability of the training word sequence data. The N-Gram language model is based on an assumption that the occurrence of the $K^{th}$ word is related to the $K-1^{th}$ word placed ahead, and is not related to any other words, and a probability of a word string is a product of the occurrence probabilities of respective words. The training word sequence corpus is various grammar files input in the vehicle-mounted environment.

The speech recognizer covers all network paths corresponding to all grammars, and has strong extensibility. For a newly-added grammar file, it is only necessary to read and parse it, build a corresponding network, deploy the network as a syllable network, and merge the syllable network with the current syllable decoding network. It is unnecessary to regenerate according to all grammar files.

The technical solution described in the present embodiment may exhibit strong extensibility, support the N-Gram language model, support the class model, present flexible use, and may be adapted for the embedded recognizer in the vehicle-mounted environment.

Figure 3:
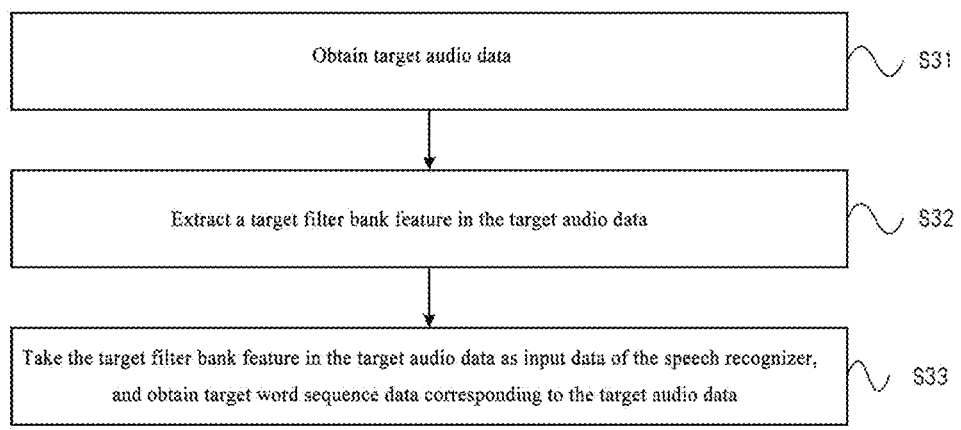
FIG. 3 is a flow chart of a speech recognition method according to an embodiment of the present disclosure.

FIG. 3 is a flow chart of a speech recognition method according to an embodiment of the present disclosure. As shown in FIG. 3, the method includes the following steps:

Step S31: obtaining target audio data;

Step S32: extracting a target filter bank feature in the target audio data;

Step S33: taking the target filter bank feature in the target audio data as input data of the speech recognizer, and obtaining target word sequence data corresponding to the target audio data.

For example, the speech recognizer includes the syllable decoding netword described above, an acoustic model and a language model.

For example, the acoustic model may be a DNN model described above, and the language model may be a N-Gram language model described above.

Optionally, the speech recognizer is a speech recognizer built in the above embodiment of the method of building the speech recognizer.

In an optional implementation of step S31,

Optionally, a vehicle-mounted terminal obtains the target audio data input by the user, and the target audio data may specifically be a speech input by the user based on the current need, and may be audio data that currently needs to be subject to speech recognition.

The vehicle-mounted terminal may be a vehicle trip computer, or may be a mobile device, such as a smart phone, connected to a vehicle-mounted computer via Bluetooth or WiFi.

Specifically, a trigger condition of speech input may be set on the vehicle-mounted terminal. For example, the trigger condition may be a speech input button, the user inputs to-be-recognized audio data by pressing the speech input button, a speech collecting module of the terminal may collect the to-be-recognized audio data, then the collected to-be-recognized audio data is sent to a speech processing module, and the speech processing module may obtain the to-be-recognized audio data.

Although the speech recognition may be performed by the cloud, there is no network or there is a weak network for the vehicle-mounted terminal in most cases; in such cases, there are some problems in using the cloud for speech recognition. Therefore, in the present embodiment, the speech processing module is an embedded recognizer on the terminal.

In an optional implementation of step S32,

Optionally, perform data framing for the target audio data, and obtain at least one frame of audio data in the target audio data; obtain a first target filter bank feature corresponding to each frame of first audio data of the at least one frame of audio data;

according to a time sequence of the at least one frame of the audio data, obtain a preset number of frames of second audio data before and after the each frame of first audio data, and obtain a second target filter bank feature corresponding to the second audio data.

In an optional implementation of step S33, the first target filter bank feature and the second target filter bank feature corresponding to the second audio data are taken as input data of a speech recognizer, and target word sequence data corresponding to the target audio data is obtained.

Optionally, the first target filter bank feature and the second target filter bank feature corresponding to the second audio data are taken as input data of the trained DNN model, and a posterior probability feature in a target phoneme/acoustic state of the first target filter bank feature output by the trained DNN model is obtained;

the target word sequence data corresponding to the target audio data is obtained from the speech recognizer by employing a phoneme/acoustic conversion probability of the trained HMM, the posterior probability feature on the target phoneme state of the first target filter bank feature, and the N-Gram language model. Since the N-Gram language model may infer a probability of occurrence of the next word by itself, so it is possible to weight a probability value of each network path in the syllable decoding network in conjunction with the probability of occurrence, increase possibility of the network path, obtain target word sequence data corresponding to the target audio data in conjunction with the N-Gram language model, and further enhance the accuracy of speech recognition.

For example, for the target audio data "今天天气 (Today's Weather)", a target word sequence data "今天天气 (Today's Weather)" corresponding to the target audio data is obtained on the network path <s_common>-<common_ngram>-</s_commnon> according to the posterior probability feature on the target phoneme/acoustic state of the first target filter bank feature.

In the present embodiment, when the target audio data is acquired, speech recognition is performed for the target audio data by obtaining the target filter bank feature in the target audio data and based on the speech recognizer obtained by pre-training, to obtain the target word sequence data. The speech recognizer includes a syllable decoding network obtained by integrating according to all grammar files, obtains the target word sequence data corresponding to the target audio data according to the network path covered therein and in conjunction with the N-Gram language model, and further enhances the accuracy of the speech recognition.

Figure 4:
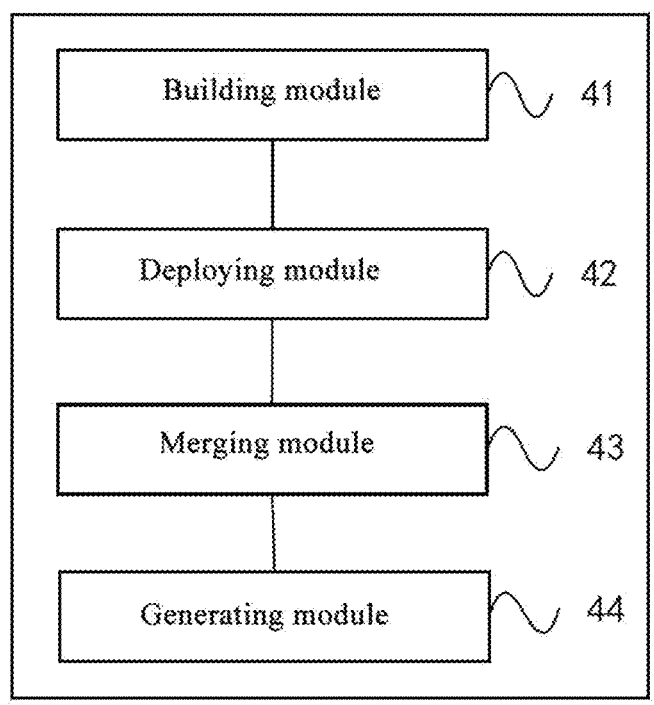
FIG. 4 is a structural schematic diagram of a system for building a speech recognizer according to an embodiment of the present disclosure.

FIG. 4 is a structural schematic diagram of a system for building a speech recognizer according to an embodiment of the present disclosure. As shown in FIG. 4, the system includes:

a building module 41 configured to read and parse each grammar file, and build a network of each grammar;

a deploying module 42 configured to read an acoustic syllable mapping relationship table, and deploy the network of each grammar as a syllable network;

a merging module 43 configured to perform a merge minimization operation for each syllable network to form a syllable decoding network;

a generating module 44 configured to form a speech recognizer by using the syllable decoding network, an acoustic model and a language model.

In an optional implementation of the building model 41,

The speech recognizer described in the present embodiment is mainly applied to a vehicle-mounted speech recognition environment, so a range of speech commands that need to be recognized is small. The grammar files corresponding to most speech commands may be obtained by collecting in advance.

Optionally, the speech command is, for example, calling XX, playing a song, today's weather, opening a map, turning on navigation, turning on a windshield wiper, and the like. The grammar file is, for example, "call\n XX\n".

The building module 41 parses the each grammar file to obtain dictionary information and a connection relationship therein.

Optionally, the dictionary information is the characteristic of each word obtained by segmenting the grammar file, for example, the characteristic of each word includes: a common word, a contact, a number, a song name, a vehicle-mounted device and so on.

Optionally, the connection relationship is a connection relationship of each word obtained by segmenting the grammar file, for example, the connection relationship is today's weather, calling+XX, calling+number, playing+song, and the like.

Optionally, the network of each grammar is built, for example, a common word <common_ngram>, the common word+contact <common_ngram>-<chn_name-ngram>, the common word+number <common_ngram>-<num_ngram>, and the common word+song name <common_ngram>-<song_ngram>.

In an optional implementation of the deploying module 42,

The deploying module 42 reads the acoustic syllable mapping relationship table, and deploys the network of each grammar as a syllable network.

Optionally, the acoustic syllable mapping relationship table is a pre-trained acoustic model, and the acoustic model is a DNN model. The DNN model is obtained by pre-training by the following method:

using a training audio corpus to train the GMM and the HMM to obtain a likelihood probability feature of each sound element/acoustic state included in at least one sound element/acoustic state output by the trained GMM, and obtain a syllable conversion probability of the trained HMM;

converting the likelihood probability feature of the each sound element/acoustic state into a posterior probability feature of each sound element/acoustic state;

calculating a matrix weight value and a matrix offset value between output layer nodes in the DNN model according to training filter bank features extracted from the training audio corpus and the posterior probability feature of the each sound element/acoustic state;

adding the matrix weight value and the matrix offset value to the DNN model to generate a trained DNN model.

Optionally, the network of each grammar is deployed as a syllable network by using the DNN model.

Optionally, each word in the network of each grammar is replaced with a DNN model of the word, the DNN model containing a transition probability between the syllable constituting the word.

Optionally, the syllable is a pronunciation of each word, for example, the syllable of "今" corresponds to "jin", the syllable of "天" corresponds to "tian", and the syllable of "气" corresponds to "qi".

A speech processing model for the grammar may be formed by combining the syllable network with the language model. If target audio data is audio data corresponding to the grammar, the target word sequence data corresponding to the target audio data is obtained by taking a sound element/acoustic state sequence of the target audio data as an input.

In an optional implementation of the merging module 43,

Optionally, the speech recognizer described in the present embodiment is mainly applied to a vehicle-mounted speech recognition environment, so a range of speech commands that need to be recognized is small. The grammar files corresponding to most speech commands may be obtained by collecting in advance. Therefore, through the above steps, the syllable network corresponding to each grammar file is obtained, and each syllable network may be independently operated to obtain the target word sequence data of its corresponding grammar. The target word sequence data of all grammars may be obtained by combining the respective syllable networks.

In order to save cost and reduce network complexity, the combinations of respective syllable networks may be merged to remove redundant relationship, and the combinations of the respective syllable networks are minimized Optionally, the combinations of the respective syllable networks may be optimized by using a computer graph theory method to obtain a syllable decoding network. Any computer graph theory method may be used for optimization here. The computer graph theory method is not described in detail any longer since it is known in prior art.

The syllable decoding network covers all the grammars, as shown in FIG. 2, for example, for an entry <s_common>, the connection relationship is that the entry <s_common> is connected to the common word <common_ngram>, and the common word <common_ngram> may be connected to the contact <chn_name-ngram>, number <num_ngram>, song name <song_ngram>, vehicle-mounted device <chezai_n-gram>, and an ending flag</s_common>. Meanwhile, a vehicle-mounted entry <s_chezai> is also provided to directly respond to a preset vehicle-mounted speech command, for example, open the map, turn on the navigation, or turn on the windshield wiper. Processing may be performed by the common word+vehicle-mounted device, or performed by directly turning on the vehicle-mounted device. <s_common> is a starting flag of a sentence, </s_common> is an ending flag of a sentence, <s_chezai> is a starting flag of the speech processed by the vehicle-mounted entry, and </s_chezai> is an ending flag of the speech processed by the vehicle-mounted entry.

In an optional implementation of the generating module 44, a speech recognizer is formed by using the sound element decoding network and a language model.

Optionally, the language model is an N-Gram language model. Since the N-Gram language model may infer a probability of occurrence of the next word by itself, so it is possible to weight a probability value of each network path in conjunction with the probability of occurrence, increase possibility of the network path, obtain target word sequence data corresponding to the target audio data in conjunction with the N-Gram language model, and further enhance the accuracy of speech recognition.

Optionally, the N-Gram language mode is obtained by training in the following manner: obtaining an occurrence probability of the training word sequence data in the training word sequence corpus, and generating an N-Gram language model according to the occurrence probability of the training word sequence data. The N-Gram language model is based on an assumption that the occurrence of the $K^{th}$ word is related to the $K-1^{th}$ word placed ahead, and is not related to any other words, and a probability of a word string is a product of the occurrence probabilities of respective words. The training word sequence corpus is various grammar files input in the vehicle-mounted environment.

The speech recognizer covers all network paths corresponding to all grammars, and has strong extensibility. For a newly-added grammar file, it is only necessary to read and parse it, build a corresponding network, deploy the network as a syllable network, and merge the syllable network with the current syllable decoding network. It is unnecessary to regenerate according to all grammar files.

The solution described in the present embodiment may exhibit strong extensibility, support the N-Gram language model, support the class model, present flexible use, and may be adapted for the embedded recognizer in the vehicle-mounted environment.

Figure 5:
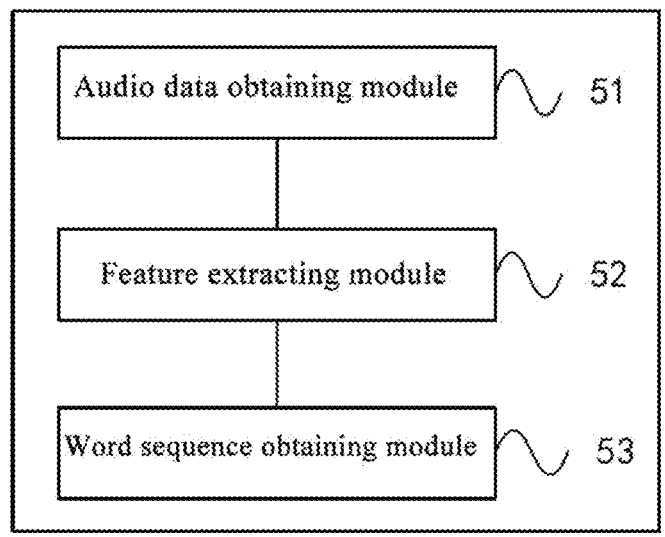
FIG. 5 is a structural schematic diagram of a speech recognition system according to an embodiment of the present disclosure.

FIG. 5 is a structural schematic diagram of a speech recognition system according to an embodiment of the present disclosure. As shown in FIG. 5, the system includes the following modules:

an audio data obtaining module 51 configured to obtain target audio data;

a feature extracting module 52 configured to extract a target filter bank feature in the target audio data;

a word sequence obtaining module 53 configured to take the target filter bank feature in the target audio data as input data of the speech recognizer, and obtain target word sequence data corresponding to the target audio data.

Optionally, the speech recognizer is a speech recognizers built in the above embodiment of the method of building the speech recognizer.

In an optional implementation of the audio data obtaining module 51,

Optionally, a vehicle-mounted terminal obtains the target audio data input by the user, and the target audio data may specifically be a speech input by the user based on the current need, and may be audio data that currently needs to be subject to speech recognition.

The vehicle-mounted terminal may be a vehicle driving computer, or may be a mobile device connected to a vehicle-mounted computer via Bluetooth or WiFi, such as a smart phone.

Specifically, a trigger condition of speech input may be set on the vehicle-mounted terminal. For example, the trigger condition may be a speech input button, the user inputs to-be-recognized audio data by pressing the speech input button, a speech collecting module of the terminal may collect the to-be-recognized audio data, then the collected to-be-recognized audio data is sent to a speech processing module, and the speech processing module may obtain the to-be-recognized audio data.

Although the speech recognition may be performed by the cloud, there is no network or there is a weak network for the vehicle-mounted terminal in most cases; in such cases, there are some problems in using the cloud for speech recognition. Therefore, in the present embodiment, the speech processing module is an embedded recognizer on the terminal.

In an optional implementation of the feature extracting module 52,

Optionally, perform data framing for the target audio data, and obtain at least one frame of audio data in the target audio data; obtain a first target filter bank feature corresponding to each frame of first audio data of the at least one frame of audio data;

according to a time sequence of the at least one frame of the audio data, obtain a preset number of frames of second audio data before and after the each frame of first audio data, and obtain a second target filter bank feature corresponding to the second audio data.

In an optional implementation of the word sequence obtaining module 53, the first target filter bank feature and the second target filter bank feature corresponding to the second audio data are taken as input data of a speech recognizer, and target word sequence data corresponding to the target audio data is obtained.

Optionally, the first target filter bank feature and the second target filter bank feature corresponding to the second audio data are taken as input data of the trained DNN model, and a posterior probability feature on a target phoneme state of the first target filter bank feature output by the trained DNN model is obtained;

the target word sequence data corresponding to the target audio data is obtained from the speech recognizer by employing a phoneme conversion probability of the trained HMM, the posterior probability feature on the target phoneme state of the first target filter bank feature and the N-Gram language model. Since the N-Gram language model may infer a probability of occurrence of the next word by itself, so it is possible to weight a probability value of each network path in the sound element decoding network in conjunction with the probability of occurrence, increase possibility of the network path, obtain target word sequence data corresponding to the target audio data in conjunction with the N-Gram language model, and further enhance the accuracy of speech recognition.

For example, for the target audio data " 今天天气 (Today's Weather)", a target word sequence data " 今天天气 (Today's Weather)" corresponding to the target audio data is obtained on the network path <s_common>-<common_ngram>-</s_commnon> according to the posterior probability feature on the target phoneme state of the first target filter bank feature.

In the present embodiment, when the target audio data is acquired, speech recognition is performed for the target audio data by obtaining the target filter bank feature in the target audio data and based on the speech recognizer obtained by pre-training, to obtain the target word sequence data. The speech recongnizer includes a sound element decoding network obtained by integrating according to all grammar files, obtains the target word sequence data corresponding to the target audio data according to the network path covered therein and in conjunction with the N-Gram language model, and further enhances the accuracy of the speech recognition.

Those skilled in the art can clearly understand that for purpose of convenience and brevity of depictions, reference may be made to corresponding processes in the aforesaid method embodiments for specific operation procedures of the system.

In the embodiments provided by the present disclosure, it should be understood that the revealed methods and apparatus can be implemented in other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

Figure 6:
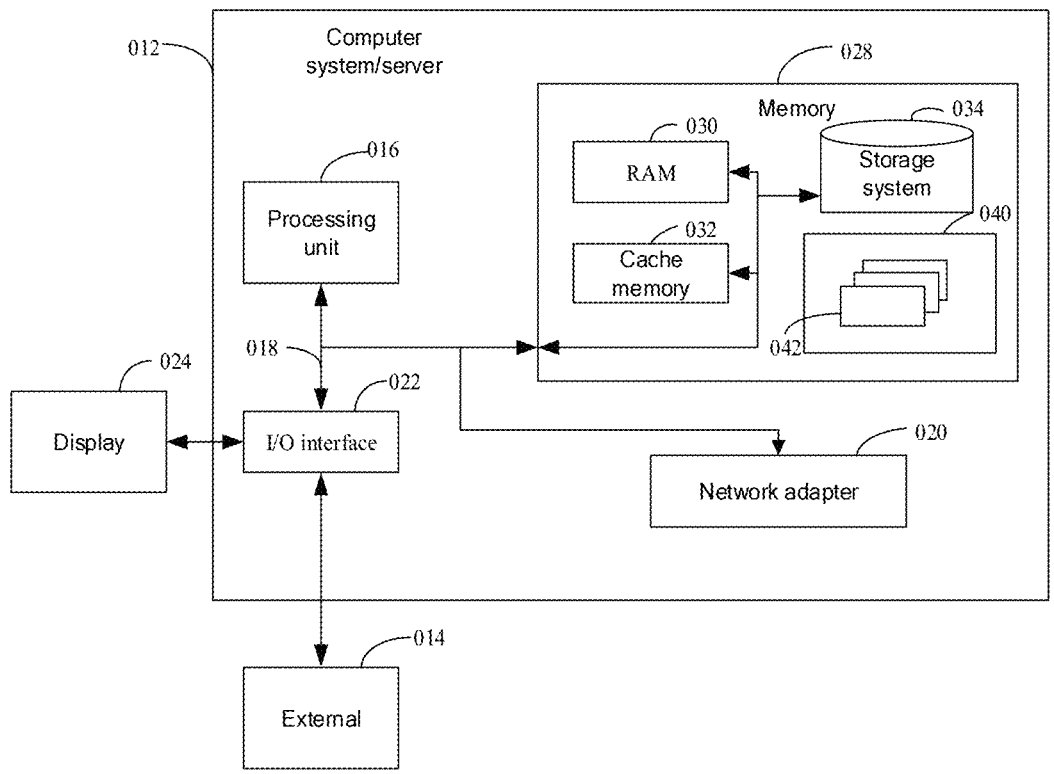
FIG. 6 illustrates a block diagram of an example computer system/server 012 adapted to implement embodiments of the present disclosure.

FIG. 6 illustrates a block diagram of an example computer system/server 012 adapted to implement an implementation mode of the present disclosure. The computer system/server 012 shown in FIG. 6 is only an example and should not bring about any limitation to the function and scope of use of the embodiments of the present disclosure.

As shown in FIG. 6, the computer system/server 012 is shown in the form of a general-purpose computing device. The components of computer system/server 012 may include, but are not limited to, one or more processors or processing units 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 may include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 may be provided for reading from and writing to a non-removable, non-volatile magnetic media (not shown in FIG. 6 and typically called a "hard drive"). Although not shown in FIG. 6, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each drive may be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc.; with one or more devices that enable a user to interact with computer system/server 012; and/or with any devices (e.g., network card, modem, etc.) that enable computer system/server 012 to communicate with one or more other computing devices. Such communication may occur via Input/Output (I/O) interfaces 022. Still yet, computer system/server 012 may communicate with one or more networks such as a local area network (LAN), a general wide area network (WAN), and/or a public network (e.g., the Internet) via network adapter 020. As depicted in FIG. 6, network adapter 020 communicates with the other communication modules of computer system/server 012 via bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data backup storage systems, etc.

The processing unit 016 executes the functions and/or methods described in the embodiments of the present disclosure by running programs stored in the memory 028.

The aforesaid computer program may be arranged in the computer storage medium, namely, the computer storage medium is encoded with the computer program. The computer program, when executed by one or more computers, enables one or more computers to execute the flow of the method and/or operations of the apparatus as shown in the above embodiments of the present disclosure.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electro-magnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium may be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those skilled in the art can clearly understand that for purpose of convenience and brevity of depictions, reference may be made to corresponding processes in the aforesaid method embodiments for specific operation procedures of the means and units.

In the embodiments provided by the present disclosure, it should be understood that the revealed methods and apparatus can be implemented in other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, and the parts shown as units may be or may not be physical units, i.e., they can be located at one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

Finally, it is appreciated that the above embodiments are only used to illustrate the technical solutions of the present disclosure, not to limit the present disclosure; although the present disclosure is described in detail with reference to the above embodiments, those having ordinary skill in the art should understand that they still can modify technical solutions recited in the aforesaid embodiments or equivalently replace partial technical features therein; these modifications or substitutions do not make essence of corresponding technical solutions depart from the spirit and scope of technical solutions of embodiments of the present disclosure.

What is claimed is:

1. A method for building a decoding network for speech recognition, comprising:
    obtaining a plurality of grammar files;
    reading and parsing each grammar file of the plurality of grammar files, and building a network of grammar for each grammar file;
    reading an acoustic syllable mapping relationship table, and deploying the network of grammar for each grammar file as a syllable network; and
    performing a merge minimization operation for all syllable networks to form the decoding network,
    wherein the acoustic syllable mapping relationship table is a pre-trained Deep Neural Network (DNN) model, and
    wherein deploying the network of grammar for each grammar file as the syllable network comprises:
    replacing each word in the network of grammar for each grammar file with the DNN model of the word, and the DNN model containing a transition probability between syllables constituting the word.

2. The method according to claim 1, wherein the reading and parsing each grammar file comprises:
    parsing each grammar file to obtain dictionary information and a connection relationship in each grammar file.

3. The method according to claim 1, wherein the syllable is a pronunciation of each word.

4. The method according to claim 1, wherein the performing a merge minimization operation for each syllable network comprises:
    optimizing combinations of the respective syllable networks by using a computer graph theory method.

5. A speech recognition method, comprising:
    obtaining target audio data;
    extracting a target filter bank feature in the target audio data;
    taking the target filter bank feature in the target audio data as input data of a speech recognizer, and obtaining target word sequence data corresponding to the target audio data,
    wherein the speech recognizer comprises an acoustic model, a language model and a decoding network, wherein the decoding network is built by:
    obtaining a plurality of grammar files;
    reading and parsing each grammar file of the plurality of grammar files, and building a network of grammar for each grammar file;
    reading an acoustic syllable mapping relationship table, and deploying the network of grammar for each grammar file as a syllable network; and
    performing a merge minimization operation for all syllable networks to form the decoding network,
    wherein the acoustic syllable mapping relationship table is a pre-trained Deep Neural Network (DNN) model, and
    wherein deploying the network of grammar for each grammar file as the syllable network comprises:
    replacing each word in the network of grammar for each grammar file with the DNN model of the word, and the DNN model containing a transition probability between syllables constituting the word.

6. The method according to claim 5, wherein the reading and parsing each grammar file comprises:
    parsing each grammar file to obtain dictionary information and a connection relationship in each grammar file.

7. The method according to claim 5, wherein the syllable is a pronunciation of each word.

8. The method according to claim 5, wherein the performing a merge minimization operation for each syllable network comprises:
    optimizing combinations of the respective syllable networks by using a computer graph theory method.

9. A computer device, comprising a memory, a processor and a computer program which is stored on the memory and runs on the processor, wherein the processor, upon executing the program, implements the method for building a decoding network for speech recognition, wherein the method comprises:
    obtaining a plurality of grammar files;
    reading and parsing each grammar file of the plurality of grammar files, and building a network of grammar for each grammar file;
    reading an acoustic syllable mapping relationship table, and deploying the network of grammar for each grammar file as a syllable network; and
    performing a merge minimization operation for all syllable networks to form the decoding network,
    wherein the acoustic syllable mapping relationship table is a pre-trained Deep Neural Network (DNN) model, and
    wherein deploying the network of grammar for each grammar file as the syllable network comprises:
    replacing each word in the network of grammar for each grammar file with the DNN model of the word, and the DNN model containing a transition probability between syllables constituting the word.

10. The computer device according to claim 9, wherein the reading and parsing each grammar file comprises:
    parsing each grammar file to obtain dictionary information and a connection relationship in each grammar file.

11. The computer device according to claim 9, wherein the syllable is a pronunciation of each word.

12. The computer device according to claim 9, wherein the performing a merge minimization operation for each syllable network comprises:
    optimizing combinations of the respective syllable networks by using a computer graph theory method.

13. A non-transitory computer-readable storage medium on which a computer program is stored, wherein the program, when executed by a processor, implements the method for building a decoding network for speech recognition, wherein the method comprises:
obtaining a plurality of grammar files;
reading and parsing each grammar file of the plurality of grammar files, and building a network of grammar for each grammar file;
reading an acoustic syllable mapping relationship table, and deploying the network of grammar for each grammar file as a syllable network; and
performing a merge minimization operation for all syllable networks to form the decoding network,
wherein the acoustic syllable mapping relationship table is a pre-trained Deep Neural Network (DNN) model, and
wherein deploying the network of grammar for each grammar file as the syllable network comprises:
replacing each word in the network of grammar for each grammar file with the DNN model of the word, and the DNN model containing a transition probability between syllables constituting the word.

14. The non-transitory computer-readable storage medium according to claim 13, wherein the reading and parsing each grammar file comprises:
parsing each grammar file to obtain dictionary information and a connection relationship in each grammar file.

15. The non-transitory computer-readable storage medium according to claim 13, wherein the syllable is a pronunciation of each word.

16. The non-transitory computer-readable storage medium according to claim 13, wherein the performing a merge minimization operation for each syllable network comprises:
optimizing combinations of the respective syllable networks by using a computer graph theory method.

* * * * *